(12) United States Patent
Yoo et al.

(10) Patent No.: US 10,397,611 B2
(45) Date of Patent: Aug. 27, 2019

(54) METHOD AND DEVICE FOR ENCODING/DECODING 3D VIDEO

(71) Applicant: LG Electronics Inc., Seoul (KR)

(72) Inventors: Sunmi Yoo, Seoul (KR); Jungdong Seo, Seoul (KR); Junghak Nam, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 15/510,807

(22) PCT Filed: Sep. 7, 2015

(86) PCT No.: PCT/KR2015/009424
§ 371 (c)(1),
(2) Date: Mar. 13, 2017

(87) PCT Pub. No.: WO2016/056755
PCT Pub. Date: Apr. 14, 2016

(65) Prior Publication Data
US 2017/0280160 A1    Sep. 28, 2017

Related U.S. Application Data

(60) Provisional application No. 62/061,165, filed on Oct. 8, 2014, provisional application No. 62/061,164, filed on Oct. 8, 2014.

(51) Int. Cl.
*H04N 19/597* (2014.01)
*H04N 19/50* (2014.01)
(Continued)

(52) U.S. Cl.
CPC ......... *H04N 19/597* (2014.11); *H04N 19/105* (2014.11); *H04N 19/146* (2014.11);
(Continued)

(58) Field of Classification Search
CPC .............................. H04N 19/597; H04N 19/176
See application file for complete search history.

(56) References Cited

U.S. PATENT DOCUMENTS 9,998,755 B2 *   6/2018   Lin ...................... H04N 19/174
2013/0271565 A1 * 10/2013   Chen ................... H04N 19/597
                                                                 348/43
(Continued)

FOREIGN PATENT DOCUMENTS

| JP | 2014-11631 | 1/2014 |
| KR | 10-2013-0105783 A | 9/2013 |
| KR | 10-2014-0080498 A | 6/2014 |

OTHER PUBLICATIONS

Fast depth modeling mode selection for 3D HEVC depth intra coding; Gu; 2013 (Year: 2013).*
(Continued)

*Primary Examiner* — Luis Perez-Fuentes
(74) *Attorney, Agent, or Firm* — Dentons US LLP (57) ABSTRACT

The present invention relates to a device and a method for coding a 3D video, a decoding method, according to the present invention, comprising the steps of: receiving a single depth mode (SDM) flag information indicating whether the SDM is applied to a current block; and if the SDM is applied to the current block, generating a prediction sample on the basis of a first candidate and a second candidate derived by using spatial neighboring reference samples of the current block, wherein the number of the spatial neighboring reference samples is two, and among the neighboring reference samples, the first neighboring reference sample is positioned on the left side of the current block, and the second neighboring reference sample is positioned on the upper side of the current block. According to the present invention, the current block may be predicted on the basis of one representative value derived by using the predetermined neigh-
(Continued)

boring reference sample, and the complexity of an operation may be decreased, and coding efficiency may be increased.

14 Claims, 7 Drawing Sheets

(51) Int. Cl.
    *H04N 19/176*      (2014.01)
    *H04N 19/70*      (2014.01)
    *H04N 19/105*      (2014.01)
    *H04N 19/593*      (2014.01)
    *H04N 19/146*      (2014.01)

(52) U.S. Cl.
    CPC ........... *H04N 19/176* (2014.11); *H04N 19/50* (2014.11); *H04N 19/593* (2014.11); *H04N 19/70* (2014.11)

(56) References Cited

U.S. PATENT DOCUMENTS

| | | | |
|---|---|---|---|
| 2014/0002594 A1 | 1/2014 | Chan et al. | |
| 2014/0240456 A1 | 8/2014 | Kang et al. | |
| 2014/0269898 A1* | 9/2014 | Thirumalai | H04N 13/161 375/240.02 |
| 2014/0286423 A1* | 9/2014 | Chen | H04N 19/597 375/240.16 |
| 2014/0301475 A1* | 10/2014 | Guo | H04N 19/50 375/240.24 |
| 2015/0195573 A1* | 7/2015 | Aflaki Beni | H04N 19/597 375/240.16 |
| 2016/0366442 A1* | 12/2016 | Liu | H04N 19/597 |
| 2017/0078701 A1* | 3/2017 | Chen | H04N 19/184 |
| 2017/0280160 A1* | 9/2017 | Yoo | H04N 19/597 |

OTHER PUBLICATIONS

Fast depth modeling mode selection for 3D HEVC depth intra coding; Gu; et al; 2013; (Year: 2013).*
Texture mode dependent depth coding in 3D-HEVC; Zhao; 2013; (Year: 2013).*
HM Software Manual HTM-12.0; Bossen et al; 2013; (Year: 2013).*
NPL internet search; Mar. 2019; (Year: 2019).*

* cited by examiner

METHOD AND DEVICE FOR ENCODING/DECODING 3D VIDEO

CROSS-REFERENCE TO RELATED APPLICATIONS

This application is the National Stage filing under 35 U.S.C. 371 of International Application No. PCT/KR2015/009424, filed on Sep. 7, 2015, which claims the benefit of U.S. Provisional Applications No. 62/061,165 filed on Oct. 8, 2014, and No. 62/061,164 filed on Oct. 8, 2014, the contents of which are all hereby incorporated by reference herein in their entirety.

BACKGROUND OF THE INVENTION

Field of the Invention

The present invention relates to a technology associated with video coding, and more particularly, to coding of a 3D video picture.

Related Art

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, a 3D video using multi-views has a high correlation between views having the same picture order count (POC). Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for coding/decoding a multi-view video, and information need for coding and/or decoding of a current view can be obtained. For example, a block to be decoded in a current view can be predicted or decoded with reference to a block in another view.

SUMMARY OF THE INVENTION

The present invention provides a method and apparatus for predicting a current block in 3 dimensional (3D) video coding.

The present invention provides a method and an apparatus for predicting a depth block in the 3D video coding.

The present invention provides a method and an apparatus of intra prediction based on a single mode in the 3D video coding.

The present invention provides a method and an apparatus for predicting the current block based on one representative value derived by using neighboring samples of the current block.

In an aspect, a method for decoding a 3D video is provided. The decoding method includes: receiving a single depth mode (SDM) flag information indicating whether the SDM is applied to a current block; and if the SDM is applied to the current block, generating a prediction sample on the basis of a first candidate and a second candidate derived by using spatial neighboring reference samples of the current block, wherein the number of the spatial neighboring reference samples is two, and among the neighboring reference samples, the first neighboring reference sample is positioned on the left side of the current block and the second neighboring reference sample is positioned on the upper side of the current block.

In another aspect, a device for decoding a 3D video is provided. The decoding device includes: a decoder receiving a single depth mode (SDM) flag information indicating whether the SDM is applied to a current block; and a predictor generating, if the SDM is applied to the current block, generating a prediction sample on the basis of a first candidate and a second candidate derived by using spatial neighboring reference samples of the current block, wherein the number of the spatial neighboring reference samples is two, and among the neighboring reference samples, the first neighboring reference sample is positioned on the left side of the current block and the second neighboring reference sample is positioned on the upper side of the current block.

According to the present invention, a current block in a current picture is predicted in 3D video coding to increase coding efficiency and decrease a data amount to be transmitted.

According to the present invention, the current block may be predicted on the basis of one representing value derived by using the predetermined neighboring reference sample in the 3D video coding, and the complexity of an operation may be decreased, and coding efficiency may be increased.

DESCRIPTION OF EXEMPLARY EMBODIMENTS

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, a pixel or a pel may mean a minimum unit constituting one picture (or image). Further, a 'sample' may be used as a term representing a value of a specific pixel. The sample may generally indicate a value of the pixel, may represent only a pixel value of a luma component, and may represent only a pixel value of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

Figure 1:
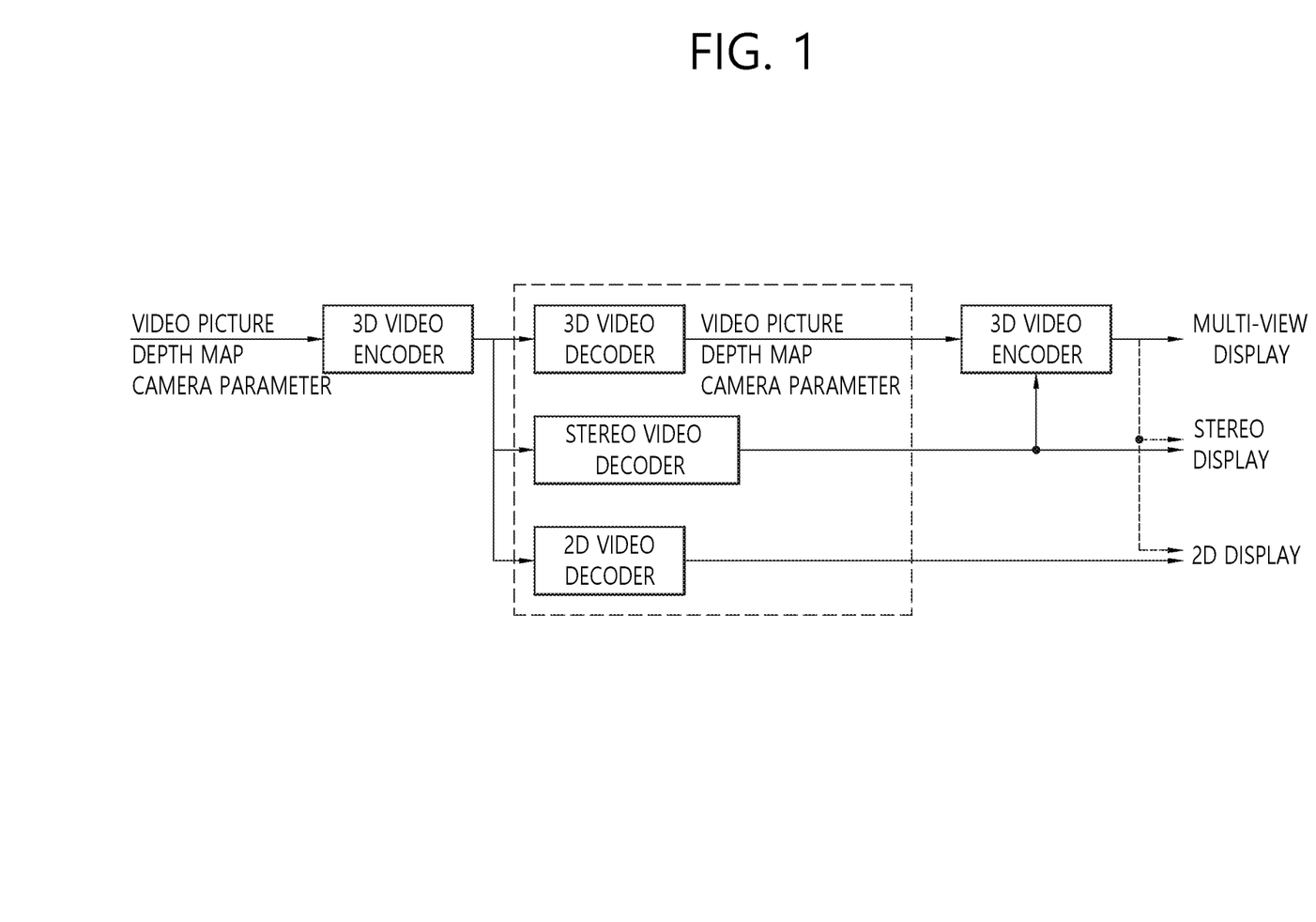
FIG. 1 briefly illustrates a 3 dimensional (3D) video encoding and decoding process to which the present invention is applicable.

FIG. 1 briefly illustrates a 3 dimensional (3D) video encoding and decoding process to which the present invention is applicable.

Referring to FIG. 1, a 3D video encoder may encode a video picture, a depth map, and a camera parameter to output a bitstream.

The depth map may be constructed of distance information (depth information) between a camera and a subject with respect to a picture of a corresponding video picture (texture picture). For example, the depth map may be an image obtained by normalizing depth information according to a bit depth. In this case, the depth map may be constructed of depth information recorded without a color difference representation. The depth map may be called a depth map picture or a depth picture.

In general, a distance to the subject and a disparity are inverse proportional to each other. Therefore, disparity information indicating an inter-view correlation may be derived from the depth information of the depth map by using the camera parameter.

A bitstream including the depth map and the camera parameter together with a typical color image, i.e., a video picture (texture picture), may be transmitted to a decoder through a network or a storage medium.

From a decoder side, the bitstream may be received to reconstruct a video. If a 3D video decoder is used in the decoder side, the 3D video decoder may decode the video picture, the depth map, and the camera parameter from the bitstream. Views required for a multi-view display may be synthesized on the basis of the decoded video picture, depth map, and camera parameter. In this case, if a display in use is a stereo display, a 3D image may be displayed by using pictures for two views among reconstructed multi-views.

If a stereo video decoder is used, the stereo video decoder may reconstruct two pictures to be incident to both eyes from the bitstream. In a stereo display, a stereoscopic image may be displayed by using a view difference or disparity of a left image which is incident to a left eye and a right image which is incident to a right eye. When a multi-view display is used together with the stereo video decoder, a multi-view may be displayed by generating different views on the basis of reconstructed two pictures.

If a 2D decoder is used, a 2D image may be reconstructed to output the image to a 2D display. If the 2D display is used but the 3D video decoder or the stereo video decoder is used as the decoder, one of the reconstructed images may be output to the 2D display.

In the structure of FIG. 1, a view synthesis may be performed in a decoder side or may be performed in a display side. Further, the decoder and the display may be one device or may be separate devices.

Although it is described for convenience in FIG. 1 that the 3D video decoder and the stereo video decoder and the 2D video decoder are separate decoders, one decoding device may perform all of the 3D video decoding, the stereo video decoding, and the 2D video decoding. Further, the 3D video decoding device may perform the 3D video decoding, the stereo video decoding device may perform the stereo video decoding, and the 2D video decoding device may perform the 2D video decoding. Further, the multi-view display may output the 2D video or may output the stereo video.

Figure 2:
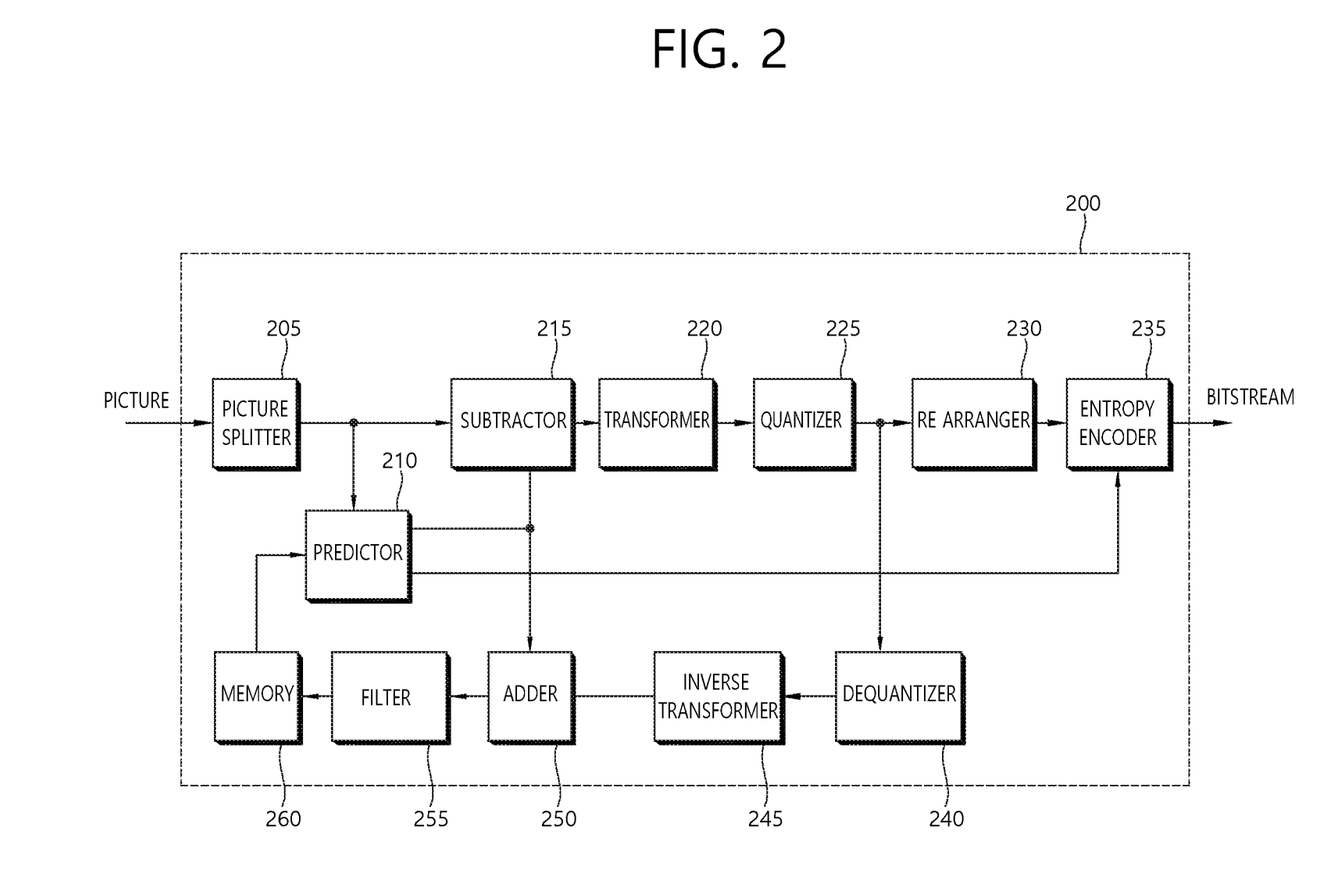
FIG. 2 briefly illustrates a structure of a video encoding device to which the present invention is applicable.

FIG. 2 briefly illustrates a structure of a video encoding device to which the present invention is applicable.

Referring to FIG. 2, a video encoding device 200 includes a picture splitter 205, a predictor 210, a subtractor 215, a transformer 220, a quantizer 225, a re-arranger 230, an entropy encoder 235, a dequantizer 240, an inverse transformer 245, an adder 250, a filter 255, and a memory 260.

The picture splitter 205 may split an input picture into at least one processing unit block. In this case, the processing unit block may be a coding unit block, a prediction unit block, or a transform unit block. As a unit block of coding, the coding unit block may be split from a largest coding unit block according to a quad-tree structure. As a block partitioned from the coding unit block, the prediction unit block may be a unit block of sample prediction. In this case, the prediction unit block may be divided into sub blocks. The transform unit block may be split from the coding unit block according to the quad-tree structure, and may be a unit block for deriving according to a transform coefficient or a unit block for deriving a residual signal from the transform coefficient.

Hereinafter, the coding unit block may be called a coding block (CB) or a coding unit (CU), the prediction unit block may be called a prediction block (PB) or a prediction unit (PU), and the transform unit block may be called a transform block (TB) or a transform unit (TU).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 210 may perform prediction on a processing target block (hereinafter, a current block), and may generate a prediction block including prediction samples for the current block. A unit of prediction performed in the predictor 210 may be a coding block, or may be a transform block, or may be a prediction block.

The predictor 210 may determine whether intra prediction is applied or inter prediction is applied to the current block. For example, the predictor 210 may determine whether the intra prediction or the inter prediction is applied in unit of CU.

In case of the intra prediction, the predictor 210 may derive a prediction sample for the current block on the basis of a reference sample outside the current block in a picture to which the current block belongs (hereinafter, a current picture). In this case, the predictor 210 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode, and the case (ii) may be called a directional mode. The predictor 210 may determine the prediction mode to be applied to the current block by using the prediction mode applied to the neighboring block.

In case of the inter prediction, the predictor 210 may derive the prediction sample for the current block on the basis of a sample specified by a motion vector on a reference picture. The predictor 210 may derive the prediction sample for the current block by applying any one of a skip mode, a merge mode, and a motion vector prediction (MVP) mode. In case of the skip mode and the merge mode, the predictor 210 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter prediction, the neighboring block includes a spatial neighboring block existing in the current picture and a temporal neighboring block existing in the reference picture. The reference picture including the temporal neighboring block may also be called a collocated picture (colPic). Motion information may include the motion vector and the reference picture. If the motion information of the temporal neighboring block is used in the skip mode and the merge mode, a top picture on a reference picture list may be used as the reference picture.

A multi-view may be divided into an independent view and a dependent view. In case of encoding for the independent view, the predictor 210 may perform not only inter prediction but also inter-view prediction.

The predictor 210 may configure the reference picture list by including pictures of different views. For the inter-view prediction, the predictor 210 may derive a disparity vector. Unlike in the motion vector which specifies a block corresponding to the current block in a different picture in the current view, the disparity vector may specify a block corresponding to the current block in another view of the same access unit (AU) as the current picture. In the multi-view, for example, the AU may include video pictures and depth maps corresponding to the same time instance. Herein, the AU may mean a set of pictures having the same picture order count (POC). The POC corresponds to a display order, and may be distinguished from a coding order.

The predictor 210 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view.

For example, the predictor 210 may add, to the merging candidate list, an inter-view merging candidate (IvMC) corresponding to temporal motion information of a reference view, an inter-view disparity vector candidate (IvDC) corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 210 may predict the motion vector of the current block on the basis of the disparity vector by applying the inter-view motion vector prediction. In this case, the predictor 210 may derive the disparity vector on the basis of a conversion of a largest depth value in a corresponding depth block. When a position of a reference sample in a reference view is specified by adding the disparity vector to a sample position of the current block in the reference view, a block including the reference sample may be used as a reference block. The predictor 210 may use the motion vector of the reference block as a candidate motion parameter of the current block or a motion vector predictor candidate, and may use the disparity vector as a candidate disparity vector for a disparity compensated prediction (DCP).

The subtractor 215 generates a residual sample which is a difference between an original sample and a prediction sample. If the skip mode is applied, the residual sample may not be generated as described above.

The transformer 220 transforms a residual sample in unit of a transform block to generate a transform coefficient. The quantizer 225 may quantize the transform coefficients to generate a quantized transform coefficient.

The re-arranger 230 re-arranges the quantized transform coefficients. The re-arranger 230 may re-arrange the quantized transform coefficients having a block shape in a 1D vector form by using a scanning method.

The entropy encoder 235 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 235 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The adder 250 adds the residual sample and the prediction sample to reconstruct the picture. The residual sample and the prediction sample may be added in unit of blocks to generate a reconstruction block. Although it is described herein that the adder 250 is configured separately, the adder 250 may be a part of the predictor 210.

The filter 255 may apply deblocking filtering and/or a sample adaptive offset to the reconstructed picture. An artifact of a block boundary in the reconstructed picture or a distortion in a quantization process may be corrected through the deblocking filtering and/or the sample adaptive offset. The sample adaptive offset may be applied in unit of samples, and may be applied after a process of the deblocking filtering is complete.

The memory 260 may store the reconstructed picture or information required for encoding/decoding. For example, the memory 260 may store (reference) pictures used in inter prediction/inter-view prediction. In this case, pictures used in the inter prediction/inter-view prediction may be designated by a reference picture set or a reference picture list.

Although it is described herein that one encoding device encodes an independent view and a dependent view, this is for convenience of explanation. Thus, a separate encoding device may be configured for each view, or a separate internal module (e.g., a prediction module for each view) may be configured for each view.

Figure 3:
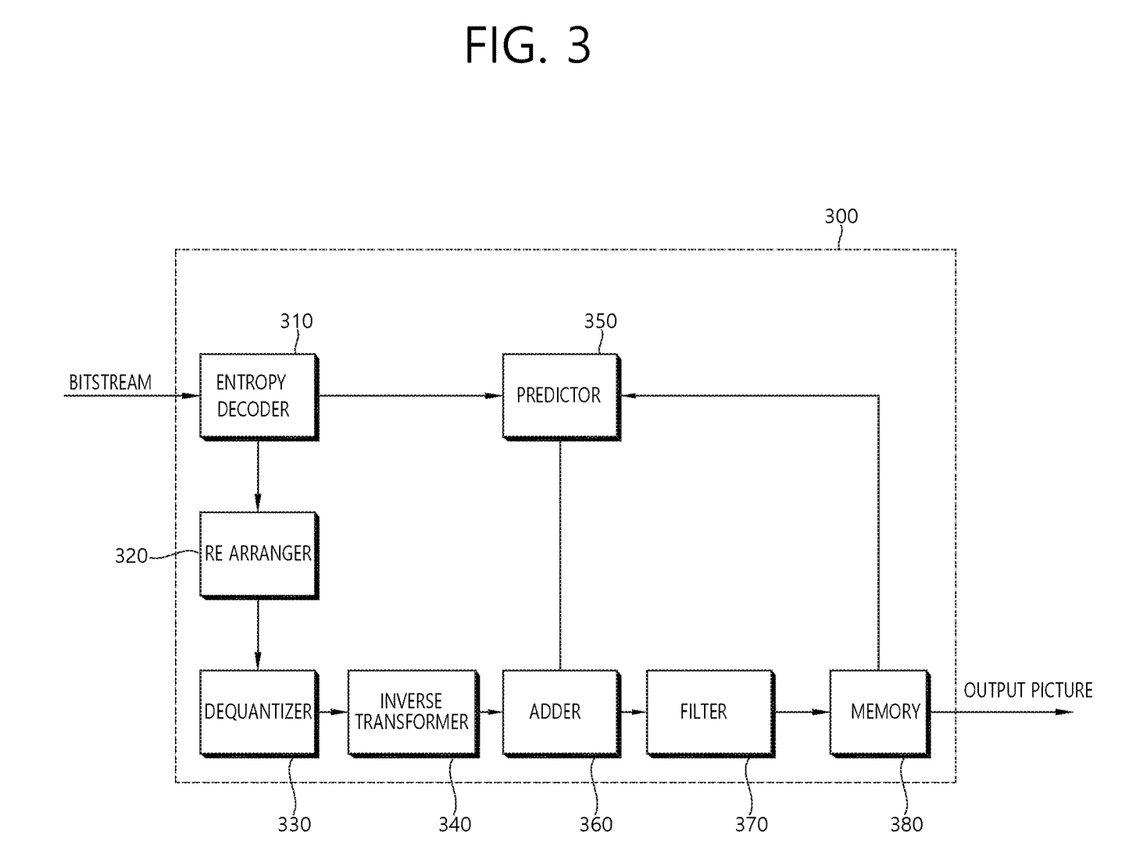
FIG. 3 briefly illustrates a structure of a video decoding device to which the present invention is applicable.

FIG. 3 briefly illustrates a structure of a video decoding device to which the present invention is applicable.

Referring to FIG. 3, a video decoding device 300 includes an entropy decoder 310, a re-arranger 320, a dequantizer 330, an inverse transformer 340, a predictor 350, an adder 360, a filter 370, and a memory 380.

When a bitstream including video information is input, the video decoding device 300 may reconstruct a video in association with a process by which video information is processed in the video encoding device.

For example, the video decoding device 300 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 310 may parse the bitstream to output information required for video reconstruction or picture reconstruction. For example, the entropy decoder 310 may decode information in the bitstream on the basis of a coding method such as exponential Golomb encoding, CAVLC, CABAC, or the like, and may output a value of a syntax element required for video reconstruction and a quantized value of a transform coefficient regarding a residual.

If a plurality of views are processed to reproduce a 3D video, the bitstream may be input for each view. Alternatively, information regarding each view may be multiplexed in the bitstream. In this case, the entropy decoder 310 may de-multiplex the bitstream to parse it for each view.

The re-arranger 320 may re-arrange quantized transform coefficients in a form of a 2D block. The re-arranger 320 may perform re-arrangement in association with coefficient scanning performed in an encoding device.

The dequantizer 330 may de-quantize the quantized transform coefficients on the basis of a (de)quantization parameter to output a transform coefficient. In this case, information for deriving a quantization parameter may be signaled from the encoding device.

The inverse transformer 340 may inverse-transform the transform coefficients to derive residual samples.

The predictor 350 may perform prediction on a current block, and may generate a prediction block including prediction samples for the current block. A unit of prediction performed in the predictor 350 may be a coding block or may be a transform block or may be a prediction block.

The predictor 350 may determine whether to apply intra prediction or inter prediction. In this case, a unit for determining which one will be used between the intra prediction and the inter prediction may be different from a unit for generating a prediction sample. In addition, a unit for generating the prediction sample may also be different in the inter prediction and the intra prediction. For example, which one will be applied between the inter prediction and the intra prediction may be determined in unit of CU. Further, for example, in the inter prediction, the prediction sample may be generated by determining the prediction mode in unit of PU, and in the intra prediction, the prediction sample may be generated in unit of TU by determining the prediction mode in unit of PU.

In case of the intra prediction, the predictor 350 may derive a prediction sample for a current block on the basis of a neighboring reference sample in a current picture. The predictor 350 may derive the prediction sample for the current block by applying a directional mode or a non-directional mode on the basis of the neighboring reference sample of the current block. In this case, a prediction mode to be applied to the current block may be determined by using an intra prediction mode of a neighboring block.

In case of the inter prediction, the predictor 350 may derive the prediction sample for the current block on the basis of a sample specified on a reference picture by a motion vector on the reference picture. The predictor 350 may derive the prediction sample for the current block by applying any one of a skip mode, a merge mode, and an MVP mode.

In case of the skip mode and the merge mode, motion information of the neighboring block may be used as motion information of the current block. In this case, the neighboring block may include a spatial neighboring block and a temporal neighboring block.

The predictor 350 may construct a merging candidate list by using motion information of an available neighboring block, and may use information indicated by a merge index on the merging candidate list as a motion vector of the current block. The merge index may be signaled from the encoding device. The motion information may include the motion vector and the reference picture. When motion information of the temporal neighboring block is used in the skip mode and the merge mode, a highest picture on the reference picture list may be used as the reference picture.

In case of the skip mode, unlike in the merge mode, a difference (residual) between the prediction sample and the original sample is not transmitted.

In case of the MVP mode, the motion vector of the current block may be derived by using the motion vector of the neighboring block as a motion vector predictor. In this case, the neighboring block may include a spatial neighboring block and a temporal neighboring block.

In case of the dependent view, the predictor 350 may perform inter-view prediction. In this case, the predictor 350 may configure the reference picture list by including pictures of different views.

For the inter-view prediction, the predictor 350 may derive a disparity vector. The predictor 350 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view. The camera parameter may be signaled from the encoding device.

When the merge mode is applied to the current block of the dependent view, the predictor 350 may add, to the merging candidate list, an IvMC corresponding to temporal motion information of a reference view, an IvDC corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 350 may predict the motion vector of the current block on the basis of the disparity vector by applying the inter-view motion vector prediction. In this case, the predictor 350 may use a block in a reference view specified by the disparity vector as a reference block. The predictor 350 may use the motion vector of the reference block as a candidate motion parameter or a motion vector predictor candidate of the current block, and may use the disparity vector as a candidate vector for disparity compensated prediction (DCP).

The adder 360 may add the residual sample and the prediction sample to reconstruct the current block or the current picture. The adder 360 may add the residual sample and the prediction sample in unit of blocks to reconstruct the current picture. When the skip mode is applied, a residual is not transmitted, and thus the prediction sample may be a reconstruction sample. Although it is described herein that the adder 360 is configured separately, the adder 360 may be a part of the predictor 350.

The filter 370 may apply de-blocking filtering and/or a sample adaptive offset to the reconstructed picture. In this case, the sample adaptive offset may be applied in unit of samples, and may be applied after de-blocking filtering.

The memory 380 may store a reconstructed picture and information required in decoding. For example, the memory 380 may store pictures used in inter prediction/inter-view prediction. In this case, pictures used in the inter prediction/inter-view prediction may be designated by a reference picture set or a reference picture list. The reconstructed picture may be used as a reference picture for a different picture.

Further, the memory 380 may output the reconstructed picture according to an output order. Although not shown, an output unit may display a plurality of different views to reproduce a 3D image.

Although it is described in the example of FIG. 3 that an independent view and a dependent view are decoded in one decoding device, this is for exemplary purposes only, and the present invention is not limited thereto. For example, each decoding device may operate for each view, and an internal module (for example, a prediction module) may be provided in association with each view in one decoding device.

Multi-view video coding may perform coding on a current picture by using decoding data of a different view belonging to the same access unit (AU) as the current picture to increase video coding efficiency for the current view.

In the multi-view video decoding, views may be coded in unit of AU, and pictures may be coded in unit of views. Coding is performed between views according to a determined order. A view which can be coded without a reference of another view may be called a base view or an independent view. Further, a view which can be coded with reference to an independent view or another view after the independent view is coded may be called a dependent view or an extended view. Further, if the current view is a dependent view, a view used as a reference in coding of the current view may be called a reference view. Herein, coding of a view includes coding of a video picture, a depth map, or the like belonging to the view.

The 3D video includes a texture picture having general color image information and a depth map having depth information on the texture picture.

The depth map may be coded by referring to coding information of the texture picture at the same point of time (the same time). In other words, the depth map may be coded by referring to the coding information of the texture picture having the same POC as the depth picture.

Since the depth map is acquired through simultaneous pick-up with the texture picture at the same time or generated by calculating the depth information of the texture picture at the same time, the depth map and the texture picture at the same time have a very high correlation.

Accordingly, in coding the depth map, information on the texture picture which has already been coded, for example, block partition information or motion information of the texture picture may be used. As one example, the motion information of the texture amp may be similarly used in the depth picture and this is referred to as motion parameter inheritance (MPI). In particular, a method for inheriting a motion vector from the texture picture is referred to as motion vector inheritance (MVI). In the MVI, the motion vector of a corresponding texture block is induced to be used as a motion prediction vector of a current block of the depth map.

Meanwhile, the motion vector of the corresponding texture block is induced and used as the motion prediction vector of the current block and disparity information of the corresponding texture block may be used when the current block is filled with a specific depth value and this is referred to as a disparity derived depth (DDD). Since the decoder may not know camera parameter information, the decoder may convert the disparity into a normalize depth value of 0 to −1 (1<<bit depth) based on the disparity information. When the DDD is applied, it is verified whether the disparity is used for inter prediction of a corresponding block (alternatively, position) and when the disparity is used, the disparity is converted into the depth value by using a disparity to depth table determined in a decoding process and thereafter, the current block may be filled with the converted depth value.

However, since the DDD requires inter-component data transmission between the texture (alternatively, color) and the depth, data information is exchanged between the texture picture and the depth map and a memory bandwidth therefor is consumed. However, since coding efficiency acquired by the DDD is not high, it is inefficient to perform the DDD. Further, in the DDD, the current block is filled with the depth value converted by using the disparity acquired from the texture block and to this end, the disparity to depth table needs to be configured. However, as a coding tool using the disparity to depth table, the DDD is unique at present and there is a burden that the disparity to depth table needs to be maintained and updated during the decoding process for only the DDD. Accordingly, in the present invention, the DDD is not performed in the decoding process.

Meanwhile, the depth map stores a distance which each pixel has as a gray scale and there are a lot of cases in which a minute depth difference between respective pixels is not large and the depth map may be expressed while being divided into two types of a foreground and a background in one block. Further, the depth map shows a characteristic in that the depth map has a sharp edge on a boundary of an object and has an almost constant value (e.g., a constant value) at a position other than the boundary.

Accordingly, since an intra prediction method used for predicting the texture picture in the related art is a prediction method suitable for a region (constant region) having a predetermined value, the intra prediction method is not effective in predicting the depth map having a different characteristic from the texture picture.

Therefore, in coding the depth map, a new intra prediction mode to reflect the characteristic of the depth map may be used. For example, in the intra prediction mode for the depth map, the current block (alternatively, depth block) of the depth map is expressed as two non-rectangular models and each region may be expressed as the constant value. In order to express the model, information indicating how the corresponding block is partitioned and information indicating which value each partition is filled with are required. A partitioning method includes Wedgelet and counter methods and the Wedgelet method is a method in which the current block is separated into two regions (partitions) based on a straight-line shape and the counter method is a method in which the current block is separated into two regions (partitions) based on a predetermined curve shape.

Meanwhile, since the depth map shows the characteristic in that the depth map has the almost constant value at the position other than the boundary, there is a high possibility that the depth map will be similar to an peripheral block. Decoded reference samples on the periphery of the current block are set as a candidate by using such a characteristic and one sample among the decoded reference samples may be used as a representative sample value of the current block. This may be called a single mode (SM) or a single depth mode (SDM). The SDM (alternatively, SM) may be applied to the depth map and applied even to the texture picture having a monotonous color, and the like by considering compatibility, and the like. In the SDM, the current block may be (intra)-predicted based on SDM flag information regarding whether the SDM is applied to the current block and SDM index information indicating which reference sample in a candidate list for the SDM is indicated (alternatively, selected). That is, prediction samples of the current block may be generated based on a value of the reference sample indicated by the SDM index.

Figure 4:
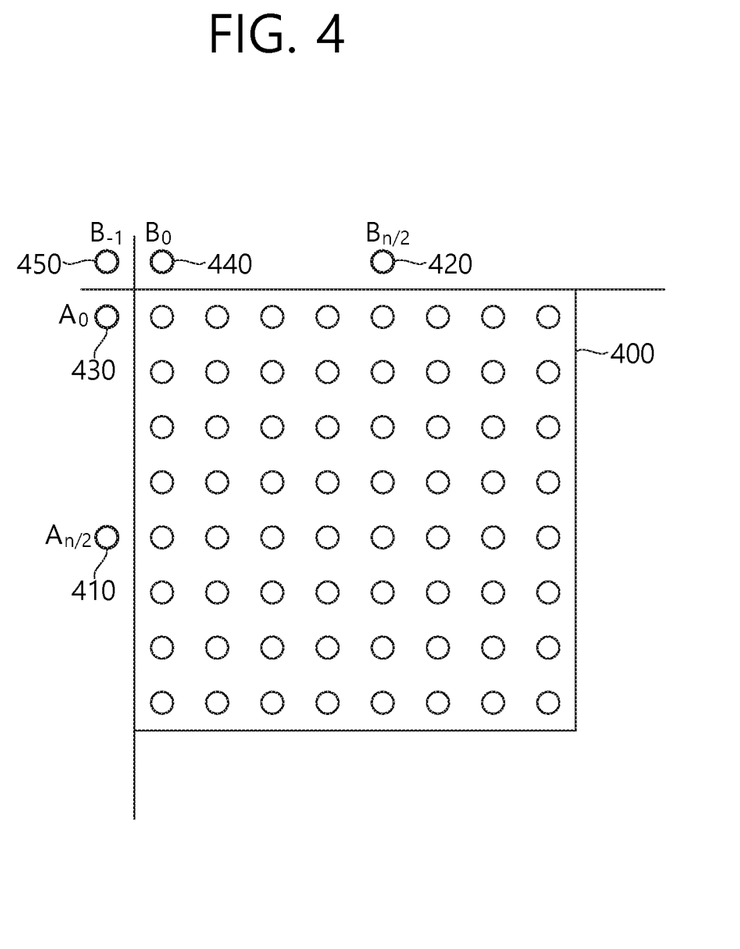
FIG. 4 is a diagram for schematically describing an intra prediction method of a current block in a depth map in a single depth mode (SDM).

FIG. 4 is a diagram for schematically describing an intra prediction method of a current block in a depth map in a single depth mode (SDM).

Referring to FIG. 4, when a current block 400 to be intra-predicted in the depth map is intra-predicted by the SDM, the current block 400 may be filled with one depth value.

In this case, the decoding device does not directly receive the depth value for filling the current block 400, but configures the candidate list based on the peripheral samples adjacent to the current block 400 and receives the SDM index information indicating a specific candidate in the configured candidate list to drive the depth value for filling the current block 400. The peripheral samples may be already reconstructed samples.

Therefore, which samples among the peripheral samples of the current block 400 are used for configuring the candidate list is very important for predicting the current block 400.

According to one example of the present invention, as the neighboring reference samples, $A_{n/2}$ 410, $B_{n/2}$ 420, $A_0$ 430, $B_0$ 440, and $B_{-1}$ 450 may be used for configuring the candidate list. Herein, $A_{n/2}$ 410 and $A_0$ 430 are positioned at a left side of the current block 400, $B_{n/2}$ 420 and $B_0$ 440 are positioned at an upper side of the current block 400, and $B_{-1}$ 450 is positioned at an upper left side of the current block 400. In the current block, each of a width (x axis) and a height (y axis) may be constituted by even samples, such as 8×8, 16×16, 32×32, and the like. In this case, $A_{n/2}$ 410 may be a sample positioned at a lower side between two samples positioned at the center in a y-axis direction among samples adjacent to a left boundary of the current block 400 and $A_0$ 430 may be a sample positioned at an innermost side among the samples adjacent to the left boundary of the current block 400. $B_{n/2}$ 420 may be a sample positioned at a right side between two samples positioned at the center in an x-axis direction among samples adjacent to an upper boundary of the current block 400 and $B_0$ 440 may be a sample positioned at a leftmost side among the samples adjacent to the left boundary of the current block 400. When it is assumed that the size of the current block is n×n and a position of a top-left sample of the current block is (0,0), the position of $A_{n/2}$ 410 may be (−1, n/2) and the position of $B_{n/2}$ 420 may be (n/2, −1). When it is assumed that the size of the current block is n×n and the position of the top-left sample of the current block is (x,y), the position of $A_{n/2}$ 410 may be (x−1, y+n/2) and the position of $B_{n/2}$ 420 may be (x+n/2, y−1).

Herein, the size of the candidate list may be fixed to 2. That is, a maximum of two candidates may be derived based on the neighboring reference samples. Samples which are not available or in which the depth values are the same as each other may be present among $A_{n/2}$ 410, $B_{n/2}$ 420, $A_0$ 430, $B_0$ 440, and $B_{-1}$ 450 which are the neighboring reference samples and in this case, two neighboring reference samples (which have different depth values and are available) may be inserted into (alternatively, allocated to) based on a predetermined search order. For example, when the current block is adjacent to the boundary of the depth map or adjacent to the boundary of an independent slice, the neighboring reference sample at a searched position may not exist or may be positioned over the slice and in this case, the corresponding peripehrla reference sample may be regarded not to be available. The search order may be the order of $A_{n/2}$ 410, $B_{n/2}$ 420, $A_0$ 430, $B_0$ 440, and $B_{-1}$ 450.

Meanwhile, an accurate prediction possibility increases as compared with the case in which a lot of neighboring reference samples are used for configuring the candidate list to enhance the coding efficiency, but calculation complexity is rather increased or unnecessary redundancy is caused to decrease the coding efficiency.

Accordingly, in another example of the present invention, as the neighboring reference samples, only $A_{n/2}$ 410 and $B_{n/2}$ 420 may be used by considering optimal efficiency. In this case, the candidate list may be derived by using only $A_{n/2}$ 410 and B$_{n/2}$ 420 as the neighboring reference samples. Herein, when the size of the candidate list is fixed to 2, the candidate list including a first candidate and a second candidate may be generated by using A$_{n/2}$ 410 and B$_{n/2}$ 420. Herein, the first candidate may be index candidate #0 and the second candidate may be index candidate #1. Herein, the index may be indicated by the SDM index information.

Samples which are not available or have different depth values may exist among A$_{n/2}$ 410 and B$_{n/2}$ 420 which are the neighboring reference samples and in this case, when one neighboring reference sample (which has a different value and is available) is derived based on the predetermined search order, one neighboring reference sample may be allocated as the first candidate and as the second candidate, a value acquired by adding 1 to the depth value of the first candidate may be used. That is, when the number of final candidates is short and a substitution value is thus required, the value acquired by adding 1 to the depth value of the first candidate may be used as the depth value of the second candidate. The search order may be the order of A$_{n/2}$ 410 and B$_{n/2}$ 420.

For example, when B$_{n/2}$ 420 is not available between A$_{n/2}$ 410 and B$_{n/2}$ 420, A$_{n/2}$ 410 may be allocated as the first candidate and the second candidate may be derived based on a depth value acquired by adding 1 as an offset value to the depth value of A$_{n/2}$ 410. As another example, when A$_{n/2}$ 410 is not available between A$_{n/2}$ 410 and B$_{n/2}$ 420, B$_{n/2}$ 420 may be allocated as the first candidate and the second candidate may be derived based on a depth value acquired by adding 1 as the offset value to the depth value of B$_{n/2}$ 420. As yet another example, when A$_{n/2}$ 410 has the same depth value as B$_{n/2}$ 420, A$_{n/2}$ 410 having a higher search order may be allocated as the first candidate and the second candidate may be derived based on the depth value acquired by 1 as the offset value to the depth value of A$_{n/2}$ 410.

Further, according to the present invention, when all pre-defined neighboring reference samples are not available, a predetermined default value may be allocated as the first candidate and the second candidate may be derived based on the depth value acquired by adding 1 as the offset value to the depth value f the first candidate. In this case, the default value may be determined based on a pre-defined bit depth value. In detail, the default value may be determined as 1<<(bit depth−1). Herein, << represents an arithmetic right shift. For example, when the bit depth value is 8 which may express 256 colors, a depth value of 128 may become the depth value of the first candidate and a depth value of 129 may become the depth value of the second candidate.

Meanwhile, when the number of candidates is short and the substitution value is thus required, 1 is not just added to the depth value of the first candidate, but the first candidate is mapped to a depth look-up table (DLT) based on the DLT and a depth value indicated by an index acquired by adding 1 to a DLT index mapped with the first candidate on the DLT may be used as the substitution value.

Figure 5:
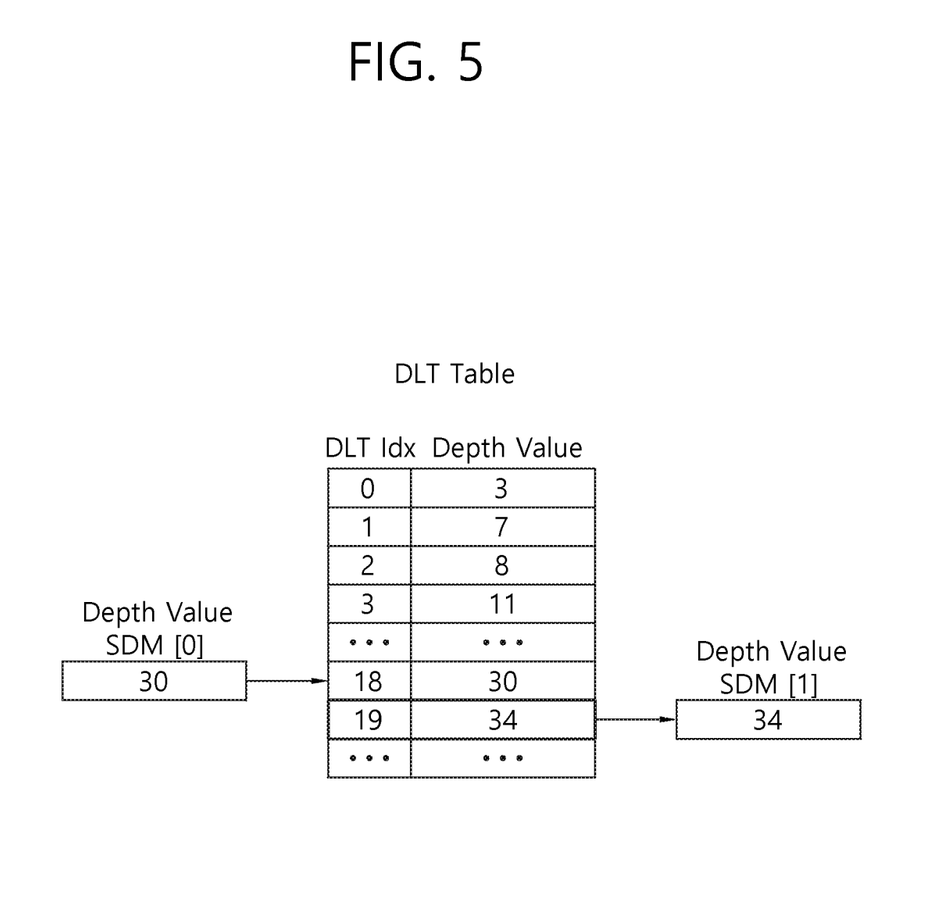
FIG. 5 is a diagram for schematically describing a method for generating a substitution candidate value using a DLT.

FIG. 5 is a diagram for schematically describing a method for generating a substitution candidate value using a DLT.

Referring to FIG. 5, SDM[0] represents the first candidate of the candidate list for the SDM and SDM[1] represents the second candidate of the candidate list. Since some of the pre-defined neighboring reference samples are not available or have the same depth value, only SDM[0] may be allocated and SDM[1] may not be allocated based on the neighboring reference samples. In this case, the depth value of the SDM[0] may be mapped to the DLT and the index corresponding to the depth value of the SDM[0] may be acquired on the DLT and thereafter, the depth value indicated by the index acquired by adding 1 to the acquired index on the DLT may be allocated to SDM[1]. For example, when the depth value of SDM[0] derived from the neighboring reference samples is 30, an index of 18 indicates a depth value of 30 on the DLT and 34 which is a depth value indicated by an index of 19 acquired by adding 1 to the index of 18 may be allocated to SDM[1].

When all of the pre-defined neighboring reference samples are not available and the depth value of SDM[0] is determined as 128 based on the bit depth value, a depth value indicated by an index in which the depth value of 128 is larger than the index mapped to the DLT by 1 on the DLT may be allocated to SDM[1].

Figure 6:
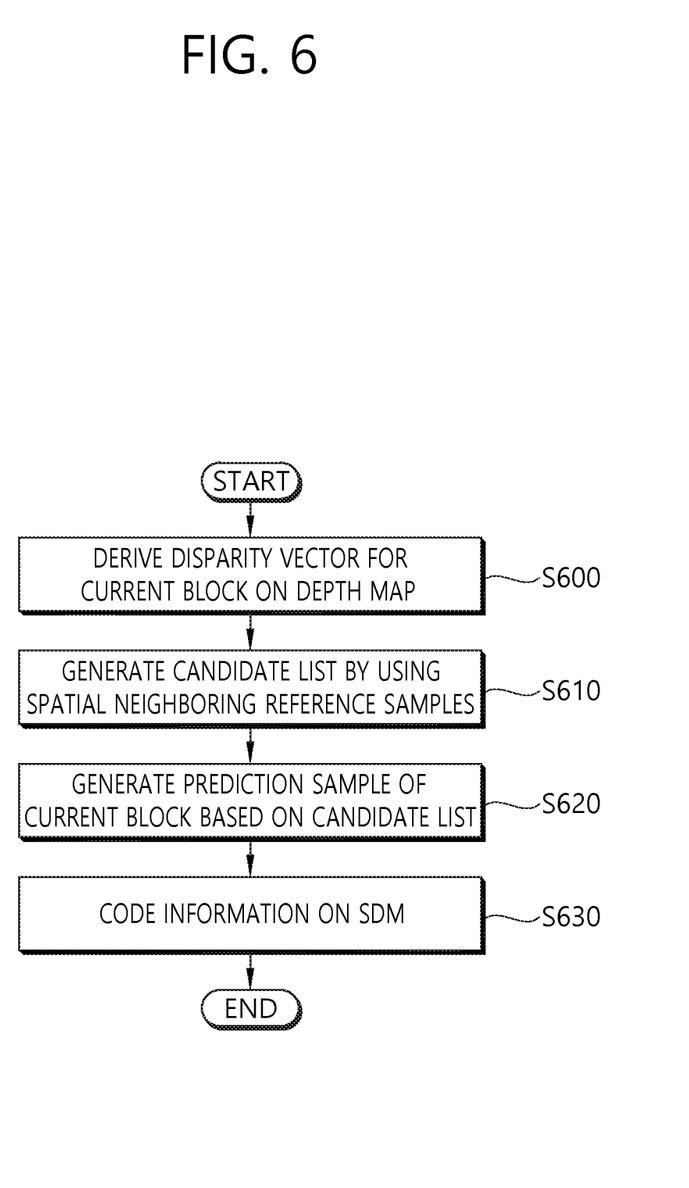
FIG. 6 is a flowchart schematically illustrating an encoding method adopting intra prediction based on the SDM according to an embodiment of the present invention.

FIG. 6 is a flowchart schematically illustrating an encoding method adopting intra prediction based on an SDM according to an embodiment of the present invention. The method of FIG. 6 may be performed by the video encoding device of FIG. 2.

Referring to FIG. 6, the encoding device determines whether the SDM is applied to the current block on the depth map (S600). The encoding device may compare the coding efficiency depending on application of various prediction methods and determine an optimal prediction method according to a predetermined criterion. The encoding device may determine that the SDM is applied among various prediction modes in order for predict the current block on the depth map. The current block may be a CU. The current block may be a PU or TU.

The encoding device generates the candidate list by using spatial neighboring reference samples of the current block when the SDM is applied to the current block (S610). The candidate list may include the first candidate and the second candidate and the size of the candidate list may be fixed to 2. In this case, the first candidate may be indicated as index #0 and the second candidate may be index #1.

The number of the spatial neighboring reference samples used for generating the candidate list may be 2 and in this case, a first neighboring reference sample among the neighboring reference samples may be positioned at the left side of the current block and a second neighboring reference sample may be positioned at the upper side of the current block. In this case, the first neighboring reference sample may be adjacent to the left boundary of the current block and the second neighboring reference sample may be adjacent to the upper boundary of the current block. Further, the first neighboring reference sample may be one of two samples positioned at the center in the y-axis direction among reconstructed samples adjacent to the left boundary of the current block and the second neighboring reference sample may be one of two samples positioned at the center in the x-axis direction among the reconstructed samples adjacent to the upper boundary of the current block.

When it is assumed that the size of the current block is n×n and the position of the top-left sample of the current block is (0,0), the position of the first neighboring reference sample may be (−1, n/2) (alternatively, (−1, n>>1)) and the position of the second neighboring reference sample may be (n/2, −1) (alternatively, (n>>1, −1)). When it is assumed that the size of the current block is n×n and the position of the top-left sample of the current block is (x,y), the position of the first neighboring reference sample may be (x−1, y+n/2) and the position of the second neighboring reference sample may be (x+n/2, y−1).

The encoding device generates a prediction sample of the current block based on the candidate list (S620). The encoding device may intra-predict the prediction sample of the current block based on the candidate list and generate the reconstructed sample based on the prediction sample. The current block may be the CU and as one example, when the CU is predicted (alternatively, coded) by the SDM, a residual which is a difference between an original block and a predicted block for the corresponding CU may not be transmitted. That is, in this case, the predicted block may become the reconstructed block.

The encoding device codes information on the SDM (S630). The encoding device may entropy-encode the information on the SDM and output the entropy-encoded information as a bitstream. The output bitstream may be transmitted through a network or stored in a storage medium. The information on the SDM may include SDM flag information indicating whether the SDM is applied to the current block and SDM index information indicating a specific candidate in the candidate list. Herein, the SDM flag information may indicate whether the SDM is applied by the unit of the CU. The bitstream may include values of syntax elements for reconstructing the current block.

Figure 7:
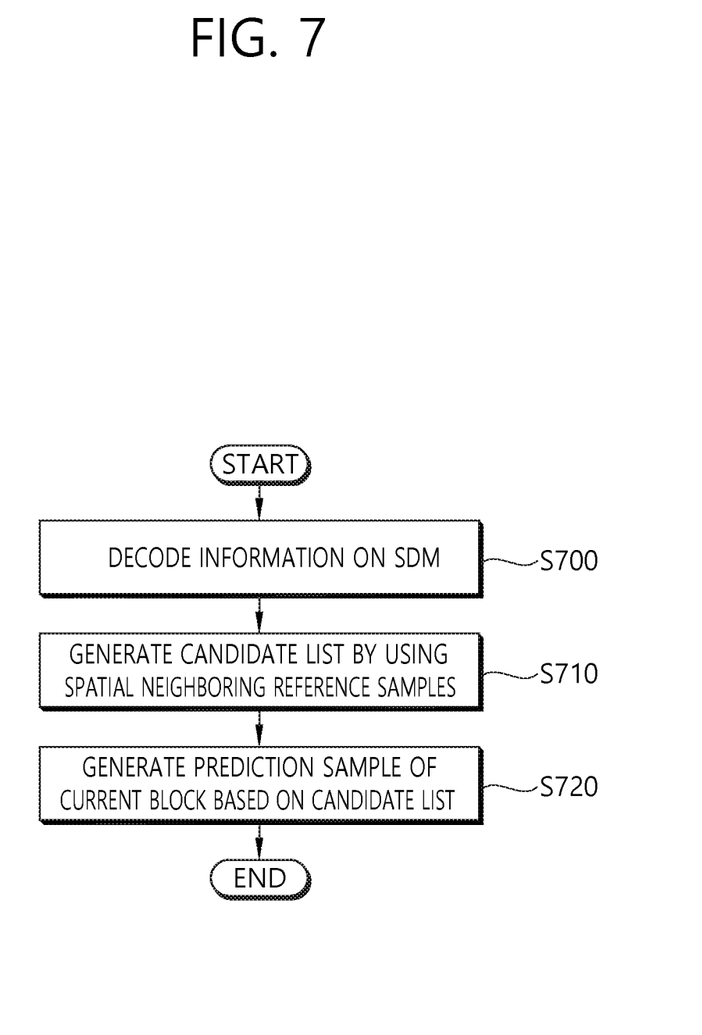
FIG. 7 is a flowchart schematically illustrating a decoding method adopting intra prediction based on the SDM according to an embodiment of the present invention.

FIG. 7 is a flowchart schematically illustrating a decoding method adopting intra prediction based on an SDM according to an embodiment of the present invention. The method of FIG. 7 may be performed by the video decoding device of FIG. 3.

Referring to FIG. 7, the decoding device decodes the information on the SDM included in the bitstream (S700). The decoding device may entropy-decode the bitstream and acquire the information on the SDM. The information on the SDM may include SDM flag information indicating whether the SDM is applied to the current block and SDM index information indicating a specific candidate in the candidate list. The bitstream may include the values of the syntax elements for reconstructing the current block.

The decoding device generates the candidate list by using the spatial neighboring reference samples of the current block when the SDM is applied to the current block (S710). The candidate list may include the first candidate and the second candidate and the size of the candidate list may be fixed to 2. In this case, the first candidate may be indicated as index #0 and the second candidate may be index #1.

The number of the spatial neighboring reference samples used for generating the candidate list may be 2 and in this case, the first neighboring reference sample among the neighboring reference samples may be positioned at the left side of the current block and the second neighboring reference sample may be positioned at the upper side of the current block. In this case, the first neighboring reference sample may be adjacent to the left boundary of the current block and the second neighboring reference sample may be adjacent to the upper boundary of the current block. Further, the first neighboring reference sample may be one of two samples positioned at the center in the y-axis direction among reconstructed samples adjacent to the left boundary of the current block and the second neighboring reference sample may be one of two samples positioned at the center in the x-axis direction among the reconstructed samples adjacent to the upper boundary of the current block.

When it is assumed that the size of the current block is n×n and the position of the top-left sample of the current block is (0,0), the position of the first neighboring reference sample may be (−1, n/2) and the position of the second neighboring reference sample may be (n/2, −1). When it is assumed that the size of the current block is n×n and the position of the top-left sample of the current block is (x,y), the position of the first neighboring reference sample may be (x−1, y+n/2) and the position of the second neighboring reference sample may be (x+n/2, y−1).

The decoding device generates the prediction sample of the current block based on the candidate list (S720). The decoding device may intra-predict the prediction sample of the current block based on the candidate list and generate the reconstructed sample based on the prediction sample. The current block may be the CU or the current block may be the PU or TU. As one example, when the CU is predicted (alternatively, coded) by the SDM, the residual which is the difference between the original block and the predicted block for the corresponding CU may not be signaled. That is, in this case, the predicted block may become the reconstructed block.

Further, as described above, the PU and the TU may be split (alternatively, partitioned) fro the CU. In this case, for example, the current block may be the CU and the SDM flag information may be given by the unit of the CU. In this case, the decoding device may determine whether the SDM is applied to the PU in the CU and performs the intra-prediction based on the SDM in the TU in the CU to finally generate the prediction sample for the CU.

Further, when the intra-prediction is applied, the PU may include one or multiple TUs. In this case, for example, the current block may be the PU. In this case, the decoding device may determine whether the SDM is applied to the PU and performs the intra-prediction based on the SDM in the TU in the CU to finally generate the prediction sample for the PU.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation, and do not intend to limit technical scopes of the present invention. Therefore, the scope of the invention should be defined by the appended claims.

When the above-described embodiments are implemented in software in the present invention, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for decoding a 3D video, the method comprising:
   receiving a single depth mode (SDM) flag information indicating whether the SDM for an intra prediction is applied to a current block and index information for the SDM;
   determining, when the SDM is applied to the current block, a first candidate and a second candidate based on neighboring reference samples of the current block;
   generating a prediction sample of the current block based on one of the first candidate and the second candidate indicated by the index information; and
   reconstructing a current picture of the 3D video comprising the current block based on the generated prediction sample,
   wherein the neighboring reference samples comprise a first neighboring reference sample positioned on a coordinate of (−1, n/2) and a second neighboring reference sample positioned on a coordinate of (n/2, −1), wherein the n represents a length of one side of the current block and a top-left sample of the current block is positioned on a coordinate of (0, 0), and wherein the number of the neighboring reference samples is two, and the first neighboring reference sample positioned on the coordinate of (−1, n/2) is adjacent to left boundary of the current block and the second neighboring reference sample positioned on the coordinate of (n/2, −1) is adjacent to upper boundary of the current block.

2. The method of claim 1, wherein the first candidate and the second candidate are included in a candidate list for the SDM, and a size of the candidate list is fixed to 2.

3. The method of claim 1, wherein the first neighboring reference sample is positioned at center regarding y-axis direction among reconstructed samples adjacent to the left boundary of the current block, and the second neighboring reference sample is positioned at center regarding x-axis direction among reconstructed samples adjacent to the upper boundary of the current block.

4. The method of claim 1, wherein the first neighboring reference sample and the second neighboring reference sample are allocated to the first candidate and the second candidate in the order of the first neighboring reference sample and the second neighboring reference sample, and when a value of the index information indicates 0, the first neighboring reference sample which is allocated earlier is determined as the first candidate.

5. The method of claim 1, wherein the current block is a coding unit (CU), and the SDM flag information indicates whether the SDM is applied by the unit of the CU.

6. The method of claim 1, wherein when any one of the first neighboring reference sample and the second neighboring reference sample is not available, another available reference sample is determined as the first candidate and the second candidate is derived based on a depth value obtained by adding 1 as an offset value to a depth value of the available reference sample.

7. The method of claim 1, wherein when the first neighboring reference sample has a depth value same as the second neighboring reference sample, the first neighboring reference sample having a higher search order is allocated as the first candidate and the second candidate is derived based on a depth value acquired by adding 1 as the offset value to the depth value of the first neighboring reference sample.

8. The method of claim 1, wherein when any one of the first neighboring reference sample and the second neighboring reference sample is not available, the other available reference sample is allocated as the first candidate, a depth value of the available reference sample is mapped to a depth look-up table (DLT), and the second candidate is derived based on a depth value indicated by an index which is larger than the index of the DLT mapped with the available reference sample by 1.

9. The method of claim 1, wherein when the first neighboring reference sample has a depth value same as the second neighboring reference sample, the first neighboring reference sample having the higher search order is allocated as the first candidate, the depth value of the first neighboring reference sample is mapped to the depth look-up table (DLT), and the second candidate is derived based on a depth value on the DLT, which is indicated by an index which is larger than an index regarding the depth value of the first neighboring reference sample by 1.

10. The method of claim 1, wherein when either the first neighboring reference sample or the second neighboring reference sample is not available, a default value is determined as the first candidate.

11. The method of claim 10, wherein the default value is determined based on a bit depth value.

12. The method of claim 11, wherein the default value is determined as 1<<(bit depth−1).

13. A method for encoding a 3D video, the method comprising:

determining whether a single depth mode (SDM) for an intra prediction is applied to a current block;

determining, when the SDM is applied to the current block, a first candidate and a second candidate based on neighboring reference samples of the current block;

generating a prediction sample of the current block based on one of the first candidate and the second candidate; and encoding a video information comprising a SDM flag information indicating whether the SDM is applied to the current block and index information indicating the one of the first candidate and the second candidate, wherein the neighboring reference samples comprise a first neighboring reference sample positioned on a coordinate of (−1, n/2) and a second neighboring reference sample positioned on a coordinate of (n/2, −1), wherein the n represents a length of one side of the current block and a top-left sample of the current block is positioned on a coordinate of (0, 0), and wherein the number of the neighboring reference samples is two, and the first neighboring reference sample positioned on the coordinate of (−1, n/2) is adjacent to left boundary of the current block and the second neighboring reference sample positioned on the coordinate of (n/2, −1) is adjacent to upper boundary of the current block.

14. A non-transitory decoder readable storage medium storing encoded image information comprising information on instructions, when executed, causing a decoder to perform the following steps:

determining whether a single depth mode (SDM) is applied to a current block;

determining, when the SDM is applied to the current block, a first candidate and a second candidate based on neighboring reference samples;

generating a prediction sample of the current block based on one of the first candidate and the second candidate; and encoding a video information comprising a flag information indicating whether the SDM is applied to the current block and index information indicating the one of the first candidate and the second candidate, wherein the neighboring reference samples comprise a first neighboring reference sample positioned on a coordinate of (−1, n/2) and a second neighboring reference sample positioned on a coordinate of (n/2, −1), wherein the n represents a length of one side of the current block and a top-left sample of the current block is positioned on a coordinate of (0, 0), and wherein the number of the neighboring reference samples is two, and the first neighboring reference sample positioned on the coordinate of (−1, n/2) is adjacent to left boundary of the current block and the second neighboring reference sample positioned on the coordinate of (n/2, −1) is adjacent to upper boundary of the current block.

\* \* \* \* \*